United States Patent Office 3,382,306
Patented May 7, 1968

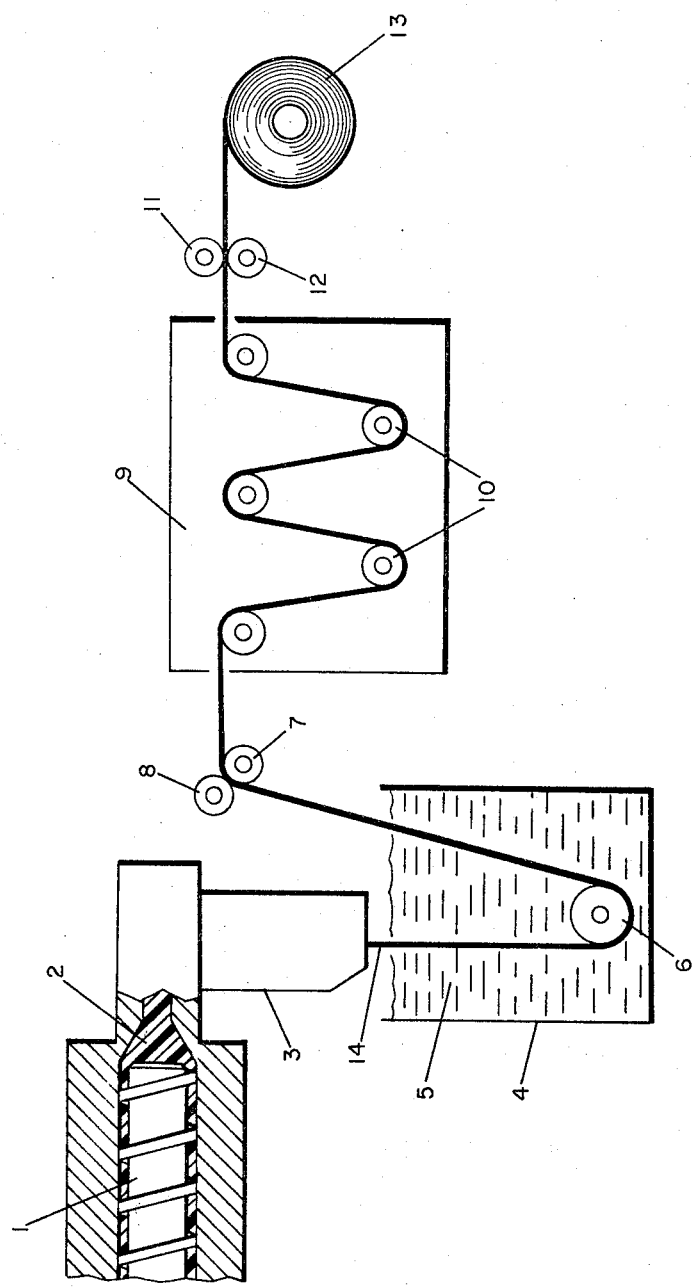

3,382,306
PROCESS OF FORMING ELASTIC
POLYPROPYLENE FILM
George C. Oppenlander, Embreeville, Pa., assignor to
Hercules Incorporated, a corporation of Delaware
Filed June 12, 1964, Ser. No. 374,634
7 Claims. (Cl. 264—178)

ABSTRACT OF THE DISCLOSURE

Polypropylene film is made elastic by extruding between 220 and 290° C., drawing down in the melt by at least 24 to 1, quenching within a short distance from the die and heat treating the resultant film in a relaxed state. Still further elasticity can be imparted if the polymer contains a small amount of an azido cross-linking agent.

---

The present invention relates to an elastic film of stereoregular polypropylene and to a process for the production of such film.

It is known to produce stereoregular polypropylene yarn which has a certain degree of elasticity, such yarns and the processes for making them being disclosed, for example, in British Patent 935,809. According to that patent, the yarns are characterized as having gamma orientation, a heat stable orientation angle of 10 to 30° and a tensile recovery on the second and succeeding cycles from a 25% elongation of at least 85%. The yarns preferably also have a gamma intensity ratio of at least 1. The patent, however, is concerned solely with the preparation of elastic yarn and gives no indication as to how one might make elastic film from the same polymer. This is not surprising inasmuch as the manufacture of a film involves distinctly different considerations from those involved in the manufacture of a fiber.

Elastic polypropylene films find many applications in the packaging field. Bands of such a film are useful, for instance, as an inexpensive substitute for rubber straps in many applications. An elastic film is useful as a covering for a window in a package because its resilience makes it more resistant to breakage when it is handled. Such films are also used as form fitting wrappers for a variety of articles.

In accordance with the present invention, there is provided with a novel film of stereoregular polypropylene, also known as crystalline or isotactic polypropylene, which film is characterized by gamma orientation and a tensile recovery from 75% elongation of at least 80%. The invention also provides a novel process for making this film which process comprises extruding molten stereoregular polypropylene at a temperature between 220 and 290° C. in the form of a film, subjecting the extruded film to a melt draw of at least 24 to 1, quenching the film in an inert liquid at a temperature of from 80 to 110° C. within ⅛ to ¼ inches from the die, and heat treating the solidified film in the relaxed state at a temperature between about 130 and 155° C. According to an optional embodiment of the process, there can be incorporated into the polymer prior to extrusion an azido cross-linking agent, the presence of which leads to still further improvement in the elastic properties of the film. The azido cross-linking agent in the latter embodiment is used in a quantity sufficient to increase the melt viscosity of the polymer but insufficient to affect its solubility in perchloroethylene at 110° C. This quantity is usually between 0.1 and 0.8 mole of azido compound per mole of polypropylene.

The familiar criterion for measuring the elastic properties of a material is its ability to return to its original length when it is relaxed after being subjected to an elongating stress. This property is referred to herein as "tensile recovery" or, more simply, as "recovery." It is expressed as a percentage of the imposed elongation which is lost upon removal of the elongating force. Percent recovery (R) is calculated as:

$$\text{Percent } R = \frac{L_e - L_r}{L_e} \times 100$$

where $L_e$ represents the distance the sample was elongated, and $L_r$ represents the portion of that elongation which is retained upon release of the elongating stress. The parameter $L_r$ may also be referred to as "permanent set." The percentage of permanent set is equal to 100 minus percent recovery. It should be obvious that higher values of recovery, or conversely, lower values of permanent set indicate greater elastic properties.

The process of the invention is illustrated in the attached drawing in which 1 designates an extruder adapted to extrude molten polymer 2 through a die 3. The numeral 4 represents a vessel containing a quenching liquid 5, e.g., water, in which is submerged an idler roll 6. Numerals 7 and 8 designate nip rolls which convey the film through the quenching liquid, 9 designates a heat treatment oven, containing a series of idler rolls 10. 11 and 12 designate an additional set of nip rolls and 13 designates a wind up station.

In operating according to the drawing, the molten polymer 2 is extruded in the form of a film 14 into the inert liquid 5 in the quench tank 4. The film is drawn through the quench tank by the nip rolls 7 and 8 which are positively driven at a rate 24 to 70 times the linear rate of extrusion of the film through the die. This increase in the linear speed of the film causes stretching of the film in its weakest section, i.e., the molten portion immediately following the die. The inert liquid in the quench tank through which the film is drawn is maintained at a temperature sufficient to solidify the film but which causes it to cool relatively slowly. A satisfactory temperature is from about 80 to 110° C. The quenched film is drawn from the tank and fed into the heat treatment oven 9 and around idler rolls 10. In passing through this oven, the film is maintained free or substantially free of tension at a temperature below its softening point. A second set of nip rolls 11 and 12 at the exit of the oven are driven at the same speed as the inlet nip rolls in order to move the film through the oven with a minimum of tension thereon. The finished film is then wound into rolls at wind up station 13.

The extruded film is subjected to a melt draw of at least 2400% or, stated otherwise, a melt draw down of at least 24 to 1. By melt draw down is meant the reduction in thickness of the extruded film while it is still in the liquid, or molten, state prior to quenching. Melt draw ratio expresses the relationship between the die opening and the ultimate thickness of the film. Melt draw down is commonly employed in the production of films and fibers from thermoplastic polymer for practical reasons. For example, the inclusion of the melt draw down permits the use of a larger size die than can be used otherwise. This permits greater precision in die manufacture and results in correspondingly greater gauge uniformity in the extruded films.

In the process of this invention, the use of a high degree of melt draw down is found to be vital to the formation of elastic film. In order to produce the elastic films of the instant invention from unmodified stereoregular polypropylene, the film must be subjected to a draw down of at least about 24 to 1 in the molten state as it leaves the die. The upper limit of melt draw down is imposed only by film breakage. Ordinarily, the problem of film breakage is found to become acute at about 70 to 1 draw down.

When the polypropylene has been modified with an azido cross-linking agent as previously noted, the amount of melt draw down required is substantially less, though substantial melt draw down is still required. This will be more fully discussed hereinafter.

When melt drawing the film by this relatively large amount, it is necessary to confine the drawing to a relatively small distance. If the draw down takes place over any sizeable distance, the resultant film exhibits an unacceptable amount of gauge variation. To assure that the drawing is thus confined, it is necessary to quench the film to the solid state within a relatively short distance of the die. Since the film will draw preferentially in the molten areas, rapid quenching tends to isolate the draw area. To obtain the optimum in gauge uniformity, the film must be quenched within ¼ inch of the die.

The quenching of the film is effected by immersing the film in a bath of cooling liquid, e.g. water, maintained at a temperature of about 80 to 110° C. It is desirable that the film not be permitted to cool too rapidly, thus the relatively high quench bath temperature. The reason why better elastic properties in the film result when the polymer is quenched slowly is not known for certain, but it is believed that this is related to the type of crystal structure which forms with slow cooling, it being known that different crystal structures can be formed in stereoregular polypropylene depending upon the rate at which the polymer is cooled from the melt.

The film which is formed by the extrusion, melt draw down, and quenching operations discussed above has very little elasticity as it is procured from the quench bath. The latent, inherent elasticity is fully developed by a tension free heat treatment at a temperature in the range of about 130 to 150° C. for a minimum time of about 3 minutes. The treatment is intended to relax any strains which may have been set up within the film as a result of the melt draw down. Thus, it is essential that the film be in a tension free state when it is so treated in order to allow relaxation. This may be accomplished very effectively on a continuous basis, as, for example, by the use of overdriven rolls in drawing a continuous advancing sheet of the film through a treatment chamber.

After heat treating the film of unmodified polypropylene to develop the latent elasticity, the film is capable of at least 85% recovery after elongation of up to about 75% in the machine direction.

Further improvements in the elasticity of the films of the instant invention result from the presence in the starting polymer of an azido cross-linking agent. When the polymer is modified by an azido cross-linking agent, it is found that the required amount of gamma orientation is imparted to the polymer by a much lower melt draw down. Melt draw down of about 20 to 25 to 1 has been found to yield a satisfactory degree of gamma orientation to produce elastic film when an azido compound is present. The lower melt draw is advantageous since higher draw down is frequently accompanied by an increased number of film breaks.

Additionally, the azido cross-linking agent-modified polymers produce films which exhibit an even higher degree of elasticity when subjected to the other process steps of the invention than do the regular unmodified polymers.

The azido cross-linking agents are exemplified by the sulfonazidies and the azidoformates. The sulfonazides have the general formula:

$$R(SO_2N_3)_x$$

where R is an aliphatic or aromatic hydrocarbon radical inert to reaction with polypropylene and $x$ is an integer greater than 1. Exemplary sulfonazides are 1,5-pentane bis(sulfonazide), 1,10-decane bis(sulfonazide), 1,3-benzene bis(sulfonazide), 1-octyl-2,4,6-benzene tris(sulfonazide), 4,4'-diphenylmethane bis(sulfonazide), 4,4'-diphenyl ether bis(sulfonazide), 4,4'-octadecyl biphenyl-3,5,3',5'-tetra(sulfonazide), 4,4' - diphenyl disulfide bis (sulfonazide), 1,6-bis(4'-sulfonazidophenyl) hexene, 2,7-naphthalene bis(sulfonazide), etc. Other sulfonazides may be used, for instance those having functional groups on the organic hydrocarbon such as halogen, carboxyl groups, carbonyl groups, etc., so long as such groups are inert to reaction with polypropylene. The azidoformates have the general structural formula.

$$R(O-\overset{O}{\underset{\|}{C}}-N_3)_x$$

where R is an organic radical inert to bridging reactions and $x$ is an integer from 2 to about 8. Exemplary of the azidoformates used are the alkyl azidoformates such as tetramethylene-bis(azidoformate), pentamethylene - bis (azidoformate); the cyclic alkyl azidoformates such as 1,4-cyclohexanedimethyl-bis(azidoformate); the aralkyl azidoformates such as α,α'-p-xylene-bis(azidoformate); the aromatic azidoformates such as 2,2-isopropylidene-bis (p,p'-phenyl azidoformate); the azidoformate ethers such as 2,2'-oxydiethyl-bis(azidoformate), 2,2'-oxydipropyl-bis (azidoformate), 2,2'-ethylenedioxydiethyl-bis(azidoformate), the tetraazidoformate of pentaerythritol-propylene oxide adduct having the general formula:

$$C(CH_2-O-CH_2\underset{\underset{CH_3}{|}}{C}H-O-\overset{O}{\underset{\|}{C}}N_3)_4$$

the azidoformate thioethers such as 2,2'-thiodiethyl-bis (azidoformate), 4,4'-thiodibutyl-bis(azidoformate); etc. It will, of course, be obvious to those skilled in the art that still other azidoformates containing functional groups, which are inert to modification reactions, such as halogen, carboxyl groups, carbonyl groups, etc., are included in the above definition.

It is known to cross-link polypropylene by the use of azido compounds such as the aforesaid sulfonazides and the azidoformates. Such cross-linked or vulcanized compositions exhibit a much higher impact strength, durability, and stiffness than does normal polypropylene and are insoluble in perchloroethylene at 110° C. The values attained by these parameters are dependent upon the amount of the azido compound which is used to effect the cross-linking.

In order to improve elastic properties of the film of this invention, it is necessary that a small amount, and only a small amount of such cross-linking agent be present. That is, the amount should be sufficient to increase the melt viscosity of the polymer but insufficient to alter its solubility in perchloroethylene at 110° C. Generally, this amount of cross-linking agent is provided by the addition of 0.1 to 0.8 mole of the azido compound per mole of polypropylene. When the amount of azido compound materially exceeds this range, the polymer is too highly cross-linked to exhibit the desired elastic properties. When the amount is below the range, little or no benefit is realized.

The azido cross-linking agent reacts with the polypropylene under the influence of heat. The temperature required to effect this reaction depends somewhat upon the particular azido compound being used, but will usually be between about 100 and 250° C. This is easily effected by control of the extruder temperature. That is to say, the polymer containing the azido compound is extruded at a temperature higher than the temperature required to cause the reaction to take place so that the reaction occurs during extrusion.

The azido cross-linking agent can be added to the polypropylene by any method commonly used to accomplish the addition of an additive to a polymer. These methods include, but are not limited to, deposition on the polymer flake from a solvent, mixing on a heated mill such as a Banbury mixer, and dry blending, or by deposition from a solvent.

In the examples which follow, film was produced essentially as outlined above using conditions outlined for each specific example. Recovery was determined by extending the sample to the specified elongation, holding it in the extended state for ten minutes, releasing it, and allowing it to relax for five minutes. Recovery is calculated as a percentage of the imposed elongation which is not retained after relaxation for five minutes.

EXAMPLE 1

Particles of stereoregular polypropylene having reduced specific viscosity of 2.4 (determined in a 0.1% solution in decahydronaphthalene at 135° C.) which corresponds to a molecular weight of about 350,000 and stabilized against light and heat were wetted with a solution in acetone of a disulfonazide prepared from a chlorinated and sulfochlorinated mixture of petroleum hydrocarbons having an average of 11 to 12 carbon atoms per mole and containing at least 0.1% chlorine (KSA). The solution was sufficiently concentrated to deposit 0.1% of the disulfonazide on the surface of the polymer. The solvent was removed by gentle heating and reduced pressure. The polypropylene flake was melted in a compounding extruder, and extruded at 233° C. at a rate of 1.33 feet per minute through a film die having a 40 mil. die gap. The film was drawn away from the die at a rate of 32 feet per minute, resulting in a draw down of 24 to 1 and a film thickness of 1.7 mils. The film was quenched in a water bath at 80° C. located ¼ inch from the extrusion die.

A second batch of the stereoregular polypropylene flake was wetted with an acetone solution of tetramethylene bis(azidoformate) (TBAF), treated as above, and extruded into a film under the same conditions as outlined.

In addition, polypropylene containing no additive was extruded and subjected to draw down of 24 to 1 and 67 to 1.

Samples of the resulting films were suspended, tension free, in a forced draft oven at 150° C. for 10 minutes. The films at this point had a high degree of gamma orientation. The percent recovery of all these films is recorded in Table 1.

Table 1

| Example No. | Additive | Draw Down | Recovery, Percent | | |
|---|---|---|---|---|---|
| | | | 10% Elong. | 20% Elong. | 75% Elong. |
| 1 | None | 24/1 | 82 | 83 | 79 |
| 2 | do | 67/1 | 87 | 90 | 86 |
| 3 | KSA | 24/1 | 94 | 95 | 91 |
| 4 | TBAF | 24/1 | 94 | 93 | 90 |

The data in the table clearly show the elasticity developed in the films as a result of the process. The data also clearly show the improved elasticity of the film made from the polymer containing the azido cross-linking agent.

What I claim and desire to protect by Letters Patent is:

1. A process of forming an elastic polypropylene film comprising extruding polypropylene into a film, subjecting the extruded film at a melt draw down of at least about 24 to 1, quenching the film at about 80 to 110° C. within a short distance of the extrusion die, and heat treating the film at about 130 to 155° C. in the relaxed state.

2. The process of claim 1 where the polymer is extruded at about 220 to 280° C.

3. The process of claim 1 where the polypropylene is modified by the incorporation therein of 0.1 to 0.8 mole of an azido cross-linking agent per mole of polypropylene whereby the melt viscosity of the polypropylene is increased without affecting its solubility in perchloroethylene at 110° C.

4. The process of claim 3 where the azido compound is selected from the class consisting of $$R(SO_2N_3)_x$$

where R is an organic radical inert to reaction with polypropylene and $x$ is an integer from 2 to about 8 and

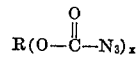

where R is an organic radical inert to reaction with polypropylene and $x$ is an integer from 2 to about 8.

5. The process of claim 3 where the cross-linking agent is a compound of the formula $R(SO_2N_3)_x$ wherein R is an organic radical inert to reaction with polypropylene and $x$ is an integer from 2 to about 8.

6. The process of claim 3 where the azido cross-linking agent is a compound of the formula

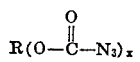

where R is an organic radical inert to reaction with polypropylene and $x$ is an integer from 2 to about 8.

7. A process of forming an elastic polypropylene film which comprises modifying stereoregular polypropylene by incorporation therein a quantity of azido cross-linking agent sufficient to provide about 0.1 to 0.8 mole equivalents of azido group per mole of polypropylene, extruding the thus modified polypropylene into a film at about 220 to 280° C., subjecting the film to a melt draw down of at least about 24 to 1, quenching the film by immersing it in water at a temperature of about 80 to 97° C. within ¼ inch of the extrusion die, and heat treating the quenched film at about 150° C. for at least about 3 minutes in the relaxed state.

References Cited

UNITED STATES PATENTS

| 3,137,745 | 6/1964 | Johnstone | 260—94.9 |
| 3,146,284 | 8/1964 | Markwood | 264—210 |
| 3,214,503 | 10/1965 | Markwood | 264—210 |

FOREIGN PATENTS

| 232,146 | 1/1961 | Australia. |
| 873,220 | 7/1961 | Great Britain. |
| 632,849 | 11/1963 | Belgium. |

ROBERT F. WHITE, *Primary Examiner.*

C. AUVILLE, *Assistant Examiner.*